United States Patent Office 2,775,612
Patented Dec. 25, 1956

2,775,612

PREPARATION OF CYANO ORGANICSULFONYL CHLORIDES

Frederick Comte, Kirkwood, Mo., assignor to Monsanto Chemical Company, St. Louis, Mo., a corporation of Delaware No Drawing. Application July 8, 1954, Serial No. 442,214

7 Claims. (Cl. 260—465)

This invention related to the preparation of cyano organicsulfonyl chlorides and more particularly pertains to an improved process for preparing cyano organicsulfonyl chlorides from trichlorophosphazo organic acyl chlorides.

Because of the presence of two exceedingly reactive groups in cyano organicsulfonyl chlorides NC—A—SO$_2$Cl wherein A is a divalent organic group; these compounds are exceptionally useful as intermediates in the synthesis of other organic chemical compounds. For example, cyano organicsulfonyl chlorides such as p-cyanobenzenesulfonyl chloride can be used as an intermediate in the preparation of alkyl substituted sulfamyl derivatives of organic acids such as p-(di-n-propylsulfamyl) benzoic acid by reacting a primary or secondary amine with the cyano organicsulfonyl chloride in an alkaline medium, for example in the presence of sodium hydroxide, and acidifying the resulting product. The cyano group can be reduced to form a primary methyl amino group, or it can be reacted with an alcohol to form an imido ester group, or it can be oxidized to an isocyano group which reacts with alcohols to form urethanes or with ammonia or amines to form ureas, or the cyano group can be utilized in any other of the nitrile reactions. Likewise, the sulfonyl chloride group can be utilized in the preparation of an unsubstituted sulfonamide group as well as mono- and di-substituted sulfonamide groups, or in the preparation of esters by the reaction of the sulfonyl chloride group with an alcohol or in the preparation of numerous other groups by utilizing the reactivity of the sulfonyl chloride group.

In general, the process of this invention is an improved process for preparing cyano organicsulfonyl chlorides from trichlorophosphazo organic acyl chlorides. The conversion of a trichlorophosphazosulfonyl organicacyl chloride to a cyano organicsulfonyl chloride takes place according to the following reaction.

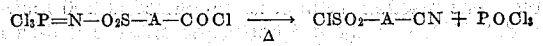

$$Cl_3P=N-O_2S-A-COCl \xrightarrow{\Delta} ClSO_2-A-CN + POCl_3$$

wherein A is a divalent organic group. The precise reaction mechanics of the above conversion reaction has not been definitely established. Considerable evidence has been presented to indicate that the conversion involves an intermolecular reaction although the possibility of an intramolecular rearrangement of reaction has not been positively overruled. However, the process of this invention is not dependent upon the precise mechanics of the conversion of the trichlorophosphazo acyl chloride.

One method suggested for the conversion of a trichlorophosphazosulfonyl organicacyl chloride to a cyano organicsulfonyl chloride is to merely heat the dry solid precursor to a temperature of at least 200° C. Another method suggested for this conversion is to heat a solution of the precursor, a trichlorophosphazosulfonyl organicacyl chloride, in dry carbon tetrachloride to a temperature of 200° C. or above. The latter process would of course have to be carried out under pressure. Both of these methods suggested for achieving the desired conversion reported substantially quantitative yields of the cyanoaromatic sulfonyl chloride, but obviously involve the use of only small quantities of the precursor for it has been found that the use of quantities greater than about 0.1 gram mole of the trichlorophosphazosulfonyl organicacyl chloride in either of the suggested methods give very erratic results. For example, the conversion will begin at 150° C. one time, 190° C. at another time and at a temperature of above 200° C. at still another time. Also, the erratic nature of the conversion reaction plus the exothermic nature of this reaction makes the control of the conversion temperatures involved difficult causing a substantial portion of the desired product to be decomposed to a cyano organic chloride through the destruction of the sulfonyl chloride group splitting out SO$_2$ because of excessively high temperatures developed. Obviously, large scale production of a cyano organicsulfonyl chloride cannot be successfully achieved by either of the suggested methods for accomplishing the conversion at any known or predictable temperature.

A third method suggested for the preparation of cyano organicsulfonyl chloride is to react a sulfamyl derivative of an organic acid with phosphorous pentachloride in the presence of phosphoryl chloride. The mixture is first slowly heated to about 60° C. at which temperature a primary reaction is said to take place, then heated to about 150° C. at which a secondary reaction is said to take place, and finally heated to a temperature of about 200° C. Such a process is reported to produce a cyano organicsulfonyl chloride in the yield of about 75%.

It is an object of this invention to provide an efficient process for converting a trichlorophosphazosulfonyl organicacyl chloride to a cyano organicsulfonyl chloride at a predeterminable and certain temperature. It is also an object of this invention to provide a conversion process which will be reproducible at any desired temperature. Other objects of this invention will be obvious from the description hereinafter appearing.

It has been discovered that the conversion of trichlorophosphazosulfonyl organicacyl chlorides having the formula

$$Cl_3P=N-O_2S-A-COCl$$

wherein A is a divalent organic group to the corresponding cyano sulfonyl chloride can be accomplished by heating said trichlorophosphazosulfonyl acyl chloride in the presence of a conversion moderator. The reaction can be carried out in the presence of an inert reaction diluent which may be solvent for either the starting material or the end product. However, the diluent employed need not be a solvent for any of the chemical compounds present.

Moderators which are useful according to this invention are the inorganic acids of phosphorous including hypophosphoric acid, orthophosphoric acid, pyrophosphoric acid, metaphosphoric acid, hypophosphorous acid, orthophosphorous acid and pyrophosphorous acid.

In general the process of this invention is carried out by heating the trichlorophosphazosulfonyl organicacyl chloride to the desired conversion temperature, under 200° C. and then adding the moderator in an amount of from 0.01 mole to 0.5 mole per mol of the trichlorophosphazosulfonyl organicacyl chloride. By following the process of this invention temperatures of 200° C. or above are not involved and consequently the formation of cyano organic chlorides by splitting out of SO$_2$ does not take place. In the preferred process of this invention usually the use of catalytic quantities, from about 0.01 mol to about 0.1 mole of the moderator per mole of the trichlorophosphazo compound, will give satisfactory results at temperatures of from 150° to 190° C. When trichlorophosphazosulfonyl organic acylchloride is heated in the presence of an aqueous solution containing 85% by weight of phosphoric acid, a substantially pure cyano organic sulfonylchloride can be produced at temperatures as low as 150° C. But conversion temperatures of up to as high as 190° C. can be employed with suitable changes as hereinafter described. Further, according to the process of this invention the phosphoryl chloride split out during the conversion is removed under reduced pressure of from 75 to 200 mm. Hg absolute. However, substantially equivalent results can be obtained at higher pressures that is from 200 mm. Hg absolute to atmospheric pressure, but of course in a longer time. The process of this invention will be decribed and illustrated in greater detail in the specific examples hereinafter appearing.

The process of this invention can be readily employed in the process for making cyano organicsulfonyl chlorides by reacting an organic sulfonamide with phosphorous pentachloride in the presence of phosphoryl chloride. Such a process comprises reacting with the sulfonamide a slight excess of phosphorous pentachloride in the presence of a quantity of phosphoryl chloride of from about ¼ to about equal parts by weight of the phosphorous pentachloride. The reaction medium is heated to a temperature of from about 100° to 115° C. until all of the HCl produced has been driven off. Thereafter, the resulting reaction mixture is heated to a temperature of about 140° C. while the pressure on the reaction system is gradually decreased to about 200 mm. Hg until all the free phosphoryl chloride has been removed. Then the moderator is added to the residue, the resulting mixtue heated to a temperature not exceeding about 190° C. to about 200° C., at reduced pressure, thereby causing the above described rearrangement to take place and POCl3 to be split out. By this process substantially quantitative yields of the desired cyano organicsulfonyl chloride can be obtained even on an industrial scale.

Trichlorophosphazosulfonyl organic acylchlorides which can be converted to cyano organic chlorides according to this invention are those having the formula $$Cl_3P=N—O_2S—A—COCl$$

wherein A is a divalent organic group. The divalent group A can be aliphatic or aromatic groups including alkyl, alicyclic including groups derived from naphthenes, aryl, alkaryl and aralkyl hydrocarbon groups as well as such groups containing non-hydrocarbon substituents such as halogens, ether and thioether substituents such as alkoxy, aryloxy, alkylthio and arylthio, nitro, amino, among others. Such groups as the hydroxy, carboxy, amino, mono-substituted amino and other reactive groups can also be present, however, such reactive groups are generally displaced during the preparation of the trichlorophosphazosulfonyl organic acylchloride which is accomplished by reacting a sulfonyl organic carboxylic acid with phosphorous pentachloride. Although the above formula indicates the presence of only one trichlorophosphazosulfonyl group, $Cl_3P=N—O_2S—$, and one acylchloride group, the process of this invention is not limited solely thereto for compounds containing more than one of either of these groups can be employed in the process of this invention.

Trichlorophosphazosulfonyl organic acylchloride reactants which can be employed in the process of this invention include among others derivatives of such sulfamyl carboxylic acids as 3-sulfamylpropionic acid, sulfamylstearic acid, 7-sulfamyl-3-phenanthrenecarboxylic acid, 4-sulfamyl-1-naphthoic acid, 5-sulfamyl-1-naphthoic acid, sulfamyl nicotinic acid, sulfamylphthalic acids, 4,5-disulfamyl-1,8-naphthalic acid, 4-sulfamylcyclohexylacetic acid, p-formylbenzenesulfonamide, p-phenol-4-sulfonamide, 2-anthraquinonesulfonamide and β-(p-sulfamylbenzoyl) propionic acid as well as non-hydrocarbon substituted derivatives of such acids.

Specific trichlorophosphazo organic acyl chlorides include trichlorophosphazosulfonyl acetyl chloride, 3-trichlorophosphazosulfonyl propionylchloride, trichlorophosphazosulfonyl stearylchloride, trichlorophosphazosulfonyl cyclopentane acyl chloride, p-(trichlorophosphazosulfonyl) cyclohexane acyl chloride, p-(trichlorophosphazosulfonyl) benzoylchloride, 7-trichlorophosphazosulfonyl-3-phenanthrene acyl chloride, 4-trichlorophosphazosulfonyl-1-naphthoylchloride, 5-trichlorophosphazosulfonyl-1-naphthoylchloride, trichlorophosphazosulfonyl-nicotinylchloride, di-(trichlorophosphazosulfonyl) phthalylchlorides, 4,5-di(trichlorophosphazosulfonyl) - 1,8-naphthalylchloride, trichlorophosphazosulfonyl cyclohexyl acetyl chloride, β - (p - trichlorophosphazosulfonylbenzoyl) propionyl chloride trichlorophosphazosulfonyl nitrobenzoyl chloride, trichlorophosphazosulfonylchlorobenzyl chloride, trichlorophosphazosulfonylchlorocyclohexane acetyl chloride, and 5-(trichlorophosphazosulfonyl) 2-furyl chloride.

The following examples are illustrative of the process of this invention.

*Example I*

362 parts of a slurry containing 1.05 moles (218 parts) of PCl5 in POCl3 is charged to a suitable dry glass lined reactor and cooled to about 30° C. There is slowly added to the cooled slurry 100.6 parts (0.5 mole) of p-sulfamylbenzoic acid while stirring the resulting mixture and while adding sufficient heat to bring it to about 40° C. whereupon reaction takes place and HCl is given off. When all of the p-sulfamylbenzoic acid has been added, the resulting reaction mixture is heated to reflux, about 117° C. and maintained at reflux conditions until evolution of HCl ceases.

Thereafter POCl3 is distilled off. This can be conveniently accomplished by starting at a temperature of about 117° and gradually reducing the pressure to about 200 mm. Hg and increasing the temperature to 140° C. until all the free POCl3, that charged in the slurry and that formed during the chlorination step, has been removed. The residual material is p-(trichlorophosphazosulfonyl) benzoylchloride having the formula:

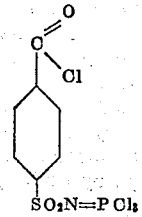

and is produced in a substantially quantitative yield.

Thereafter the above compound is heated to 190° C. and 5.5 parts of 96.6% ortho phosphoric acid are added dropwise at the rate of about one drop per second. After a few drops of this phosphoric acid had been added, POCl3 split out by the rearrangement reaction and again distilled off. The reaction medium is maintained at 200 mm. Hg and 190° C. for about 3 hours, the pressure is then further reduced to 100 mm. Hg and held there for about one hour. The residual material is cooled to 50° C. and 156 parts of toluene is added thereto. The resulting mixture is heated to 70° C., filtered and the filter cake containing phosphoric acid, derivatives or complexes, is washed with 56 parts of hot toluene (65° C.). There is recovered 359.3 part of toluene solution of which 212 parts are toluene and 147.3 parts are p-cyanobenzenesulfonyl chloride, a yield of 99%.

*Example II*

A suitable reactor having a distillation head is charged with 5065 parts of a mixture containing 2247 parts of p-trichlorophosphazobenzoyl chloride and 2818 parts of phosphoryl chloride and is heated at 200 mm. Hg until about 2755 parts of phosphoryl chloride is distilled off beginning at about 75° C. and ending at a temperature of about 150° to 152° C. Then 60 parts of 85% phosphoric acid are added rapidly over a period of one hour while slowly increasing the temperature to 160° and maintaining a pressure of 200 mm. Hg absolute. As soon as a few parts of phosphoric acid has been added, the rearrangement reaction begins and POCl₃ is split out. The reaction temperature is gradually increased to a temperature of from 170° to 172° C. to maintain as high a rate of distillation and removal of POCl₃ as is practical. When rate of POCl₃ distillation decreases, again the pressure is reduced to 100 mm. Hg absolute and held there until POCl₃ no longer distills off. The residue in the reactor is cooled to about 50° C., dissolved in toluene, heated to 70° C., filtered and the filter cake washed with hot toluene. The toluene is distilled off at reduced pressure leaving about 1280 parts, a yield of about 98%, of substantially pure p-cyanobenzenesulfonyl chloride.

*Example III*

The process of Example I is repeated except that 85% phosphoric acid is added in place of the orthophosphoric acid (96.6%) when the distillation temperature had reached 170° C. at 200 mm. Hg absolute. The yield of p-cyanobenzenesulfonyl chloride recovered is about 95%.

*Example IV*

The process of Example I is repeated except that 85% phosphoric acid is added in place of orthophosphoric acid (96.6%) when the distillation temperature had reached 180° C. at 200 mm. Hg absolute. The yield of p-cyanobenzenesulfonyl chloride recovered is about 95%.

*Example V*

The process of Example I is repeated except that 85% phosphoric acid is added in place of orthophosphoric acid (96.6%) when the distillation temperature had reached 190° C. at 200 mm. Hg absolute. The yield of p-cyanobenzenesulfonyl chloride recovered is about 95%.

*Example VI*

To prepare 2-cyano-5-furansulfonyl chloride, one mole of 5-(trichlorophosphazosulfonyl)-2-furyl chloride in 503 parts of phosphoryl chloride obtained by the reaction of about 2.5 moles of PCl₅ with one mole of 2-sulfamyl-5-furoic acid in the presence of 350 parts of POCl₃, is heated in suitable distillation equipment at 200 mm. Hg until about 450 parts of POCl₃ is distilled off between a temperature of 75° C. and 160° C. While maintaining a temperature of about 160° C. and 200 mm. Hg pressure, 10 parts of 85% phosphoric acid are added slowly to the hot material in the still pot. After a few parts of the phosphoric acid are added, the rate of distillation of phosphoryl chloride increases indicating that the rearrangement reaction is taking place splitting out POCl₃. When the distillation of POCl₃ apparently stops, the pressure in the distillation equipment is reduced to about 100 mm. Hg absolute for about an hour and no heat is supplied to the still pot. The residue in the still pot is cooled to about 50° C. and then dissolved in toluene and the resulting solution filtered. 2-cyano-5-furansulfonyl chloride can be recovered by distilling off the toluene at reduced pressure.

2-cyano-5-furansulfonyl chloride,

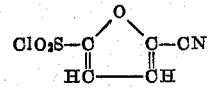

can be converted to 5-(di-n-propyl) sulfamyl-2-furoic acid, a compound similar to Benemid, by reaction with di-n-propylamine in the presence of sodium hydroxide followed by acidification with hydrochloric or sulfuric acid.

*Example VII*

1,8-dicyano-naphthalene-4,5-disulfonylchloride is prepared by heating 0.25 mole of 4,5-di(trichlorophosphazosulfonyl) 1,8-naphthalyl dichloride obtained from the reaction of 0.25 mole 4,5-disulfamyl-1,8-naphthoic acid and 1.25 moles of PCl₅ in POCl₃ after removing the free POCl₃, to about 175° C. at 200 mm. Hg absolute and adding slowly thereto about 5 parts of 96.6% ortho phosphoric acid and removing the POCl₃ split out as rapidly as possible. When POCl₃ is no longer evolved, the residue is held at about 90 mm. Hg absolute until its temperature is about 50° C., dissolved in toluene and filtered. The desired product can be obtained from the toluene solution by the recovery of the toluene at reduced pressure.

*Example VIII* p-cyanocyclohexanesulfonyl chloride is prepared from p-trichlorophosphazosulfonylcyclohexyl acyl chloride obtained from the reaction of PCl₅ with p-sulfamylcyclohexane carboxylic acid, by heating at 160° C. at about 180 mm. Hg absolute and, while maintained at these conditions, adding thereto about 2 parts of 85% phosphoric acid per 100 parts of trichlorophosphazosulfonylcyclohexyl acyl chloride. The POCl₃ evolved is distilled off substantially as rapidly as formed. When POCl₃ is no longer evolved, the pressure is further reduced to about 85 mm. Hg and there maintained until the residual material is cooled to about 50° C. The residue is dissolved in toluene, filtered and the toluene removed at reduced pressure. The solid residue is the desired product.

*Example IX*

4-trichlorophosphazosulfonyl-2-nitrobenzoyl chloride, obtained by reacting 4-sulfamyl-2-nitrobenzoic acid with PCl₅ is heated to 150° C. at about 190 mm. Hg absolute with the slow addition of about 3% by weight of 85% phosphoric acid while removing the POCl₃ formed as rapidly as possible. When POCl₃ is no longer evolved, the resulting residue is held at a pressure of about 100 mm. Hg absolute without heating until the temperature of the residue reaches 50° C. The residue is dissolved in toluene at about 75° C. and the hot solution filtered. The 4-cyano-2-nitrobenzenesulfonyl chloride produced can be obtained by heating the solution under reduced pressure to remove the toluene.

What is claimed is:

1. In the preparation of a cyanoorganicsulfonyl chloride by heating a trichlorophosphazosulfonyl organicacyl chloride, the step comprising heating said trichlorophosphazosulfonyl organicacyl chloride at a temperature of from 150° to 190° in the presence of an inorganic acid of phosphorus and removing the POCl₃ as rapidly as formed.

2. The process of claim 1 wherein the POCl₃ is removed at reduced pressure of from 75 to 200 mm. Hg absolute.

3. The process of claim 1 wherein the POCl₃ is removed at reduced pressure of from 75 to 200 mm. Hg absolute and the acid of phosphorous is 85% phosphoric acid.

4. The process of claim 1 wherein the POCl₃ is removed at reduced pressure of from 75 to 200 mm. Hg absolute and the acid of phosphorus is orthophosphoric acid.

5. In the preparation of p-cyanobenzenesulfonyl chloride by heating p-trichlorophosphazobenzoyl chloride and splitting out POCl₃, the step comprising heating p-trichlorophosphazobenzoyl chloride in the presence of from 0.01 to 0.5 mole of an inorganic acid of phosphorous at a temperature of from 150° to 190° C. and a pressure of from 75 to 200 mm. Hg absolute while removing POCl₃ as rapidly as evolved.

6. The process of claim 5 wherein the acid of phosphorus is orthophosphoric acid.

7. The process of claim 5 wherein the acid of phosphorus is an aqueous solution containing 85% phosphoric acid.

References Cited in the file of this patent

Kirsanov: Chem. Abst., vol. 46, col. 1135 (1952).